United States Patent
Da Cunha et al.

(10) Patent No.: US 8,003,027 B2
(45) Date of Patent: Aug. 23, 2011

(54) PROCESS FOR THE PREPARATION OF POLYMER YARNS FROM ULTRA HIGH MOLECULAR WEIGHT HOMOPOLYMERS OR COPOLYMERS, POLYMER YARNS, MOLDED POLYMER PARTS, AND THE USE OF POLYMER YARNS

(75) Inventors: Fernanda Oliveira Vieira Da Cunha, Porto Alegre, Rio Grande do Sul (BR); Alan Kardec do Nascimento, Salvador, Bahia (BR); Breno de La Rue, Americana-SP (BR); Martha De La Rue Beckerdorf, Vila Jones-Americana-São Paulo (BR)

(73) Assignees: Braskem S.A., Camacari (BR); Profil Ind E Com de Fios Ltda., Sao Paulo (BR)

( * ) Notice: Subject to any disclaimer, the term of this patent is extended or adjusted under 35 U.S.C. 154(b) by 381 days.

(21) Appl. No.: 11/979,951

(22) Filed: Nov. 9, 2007

(65) Prior Publication Data
US 2008/0290550 A1 Nov. 27, 2008

(30) Foreign Application Priority Data
May 24, 2007 (BR) .................................. 0702313

(51) Int. Cl.
*D01D 5/06* (2006.01)
*D01D 5/16* (2006.01)
*D01F 6/02* (2006.01)
*D02J 13/00* (2006.01)

(52) U.S. Cl. ............. 264/103; 264/178 F; 264/180; 264/203; 264/210.7; 264/210.8; 264/211.15; 264/211.16; 264/211.17; 264/234

(58) Field of Classification Search ............. 264/103, 264/180, 203, 178 F, 210.7, 210.8, 211.15, 264/211.16, 211.17, 234
See application file for complete search history.

(56) References Cited

U.S. PATENT DOCUMENTS

| | | | | |
|---|---|---|---|---|
| 3,671,542 A * | 6/1972 | Kwolek | ............... | 264/210.8 X |
| 3,822,333 A * | 7/1974 | Haruta et al. | ............ | 264/180 X |
| 4,129,629 A * | 12/1978 | Gordon | ............ | 523/340 |
| 4,663,101 A * | 5/1987 | Kavesh et al. | ............ | 264/178 F |
| 6,063,866 A * | 5/2000 | Wang et al. | ............ | 525/64 |
| 7,147,807 B2 * | 12/2006 | Kavesh | ............ | 264/37.13 |
| 2006/0079656 A1 * | 4/2006 | DesLauriers et al. | ....... | 526/348.5 |

* cited by examiner

*Primary Examiner* — Leo B Tentoni
(74) *Attorney, Agent, or Firm* — Birch, Stewart, Kolasch & Birch LLP

(57) ABSTRACT

A process for the preparation of polymer yarns from ultra high molecular weight homopolymers or copolymers which includes the steps of preparing a suspension of a homopolymer or copolymer and a spinning or gelling solvent, extruding the suspension with the formation of a gel, spinning the gel to obtain non-stretched filaments or yarns, cooling the non-stretched filaments or yarns, feeding the non-stretched filaments or yarns, to an extractor together with the feed of an organic extraction solvent, extracting the non-polar long chain solvent impregnated in the yarns, drying the non-stretched filament bundles or yarns, and stretching said dry yarns at a temperature in excess of 80° C.

29 Claims, 7 Drawing Sheets

US 8,003,027 B2

PROCESS FOR THE PREPARATION OF POLYMER YARNS FROM ULTRA HIGH MOLECULAR WEIGHT HOMOPOLYMERS OR COPOLYMERS, POLYMER YARNS, MOLDED POLYMER PARTS, AND THE USE OF POLYMER YARNS

This Nonprovisional application claims priority under 35 U.S.C. §119(a) on Patent Application No(s). PI 0702310-3 filed in Brazil on May 24, 2007, the entire contents of which are hereby incorporated by reference.

FIELD OF THE INVENTION

The present invention refers to a process for the preparation of high-performance yarns of ultra high molecular weight homopolymers or copolymers, with a mono, bi, or multimodal molecular weight distribution, obtained from $C_{2+n}$ monomers, wherein n varies from 0 to 2.

The invention refers not only to the yarns obtained in this way, but to the parts manufactured from the high performance yarns, as well. More specifically, the process of the present invention utilizes an ultra high molecular weight polyethylene (UHMW PE), with a reactor bimodal or multimodal molecular weight distribution.

Homopolymer or copolymer yarns based on ultra high molecular weight polyethylene (UHMW PE) and on high molecular weight polypropylene mixed with UHMW PE have been widely utilized in several applications requiring high tenacity as well as high chemical resistance, paired with a light weight. Such applications are related to the manufacture of fabrics for ballistic use, ropes, fishing lines, chemical filters and separators for electrolytic cells in replacement of asbestos, specific sports related clothing and other parts, and fabrics for the manufacture of parachutes and helmets.

The present process for the preparation of yarns based on ultra high molecular weight homopolymers and copolymers is different from traditional processes mainly because of the following aspects:

(i) the use of homopolymers and copolymers with a bimodal or multimodal molecular weight profile, preferably selected from reactor bimodal homopolymers or copolymers, which will make it easier to process the gel and which will enable the operation at higher polymer concentrations, therefore improving industrial productivity;

(ii) the introduction of a controlled inerting system, which encompasses all steps from the initial suspension feed preparation, which comprises the mixture of solvent and polymer, the subsequent feed of said mixture to the extruder, until the exit of the filaments from the spin block and their entry to the tank (cooling step), where there will happen the crystallization of the polymeric material;

(iii) an improved cooling mechanism of the non stretched yarns that exit the spinneret, operating in such a way as to allow them to reach the cooling bath which operates by means of a geyser type radial or transversal spray, internal to the non stretched collection of filaments;

(iv) the use of a solvent extraction step, which accomplishes the extraction of the solvent used in the spinning process, from here on called the spinning solvent or gel forming solvent, in a non continuous operation, with the turbulent circulation of the extraction solvent around the spools or reels where the non stretched yarns are spun.

BACKGROUND OF THE INVENTION

Thanks to their outstanding mechanical properties, yarns based on homopolymers or copolymers obtained from $C_{2+n}$ monomers, wherein n varies from 0 to 2, such as ultra high molecular weight polyethylene and high molecular weight polypropylene homopolymer, have been used in special applications, which require that the material be able to withstand high deformation stresses, at the time of use. Such situations discussed herein, where high deformation stresses are present, can be the such of explosions or ballistic impacts.

One of the pioneering processes for the manufacture of fibers from ultra high molecular weight polyethylene (UHMW PE) was patented by the company Stamicarbon in 1977, which is described in U.S. Pat. No. 4,137,394. In this patent, a vessel was used for the dissolution of the UHMW PE in a first solvent, so that an extruded monofilament could be obtained from a single or twin screw extruder, and said monofilament treated in a bath with a second solvent, in a continuous manner. This process was later improved, and three additional patents were obtained by the same company in 1980: U.S. Pat. No. 4,422,993, GB 2,042,414 and GB 2,051,667. According to these patents, the polymer dissolution process was carried out in batches.

At the beginning of the 80s, Allied Corporation was granted patents for the continuous manufacture of UHMW PE yarns process for the, as described in U.S. Pat. No. 4,413,110 and U.S. Pat. No. 4,663,101. According to this Allied Corporation's process, the gel formation occurs in a vessel that feeds the extruder, which is in line with a fiber extraction and drying system. Allied Corporation was also granted other patents related to the manufacture of high performance ballistic fabrics using UHMW PE yarns (U.S. Pat. No. 4,403,012, U.S. Pat. No. 4,876,774, U.S. Pat. No. 4,681,792 and U.S. Pat. No. 4,916,000).

Since then, a series of improvements has been made to the process for producing polymeric yarns, aiming to obtain a higher tenacity, higher elasticity modulus and lower elongation material.

U.S. Pat. No. 4,663,101 assigned to Allied Corporation discloses a process in which the polymer is mixed with a first paraffinic oil solvent, in a mixing vessel, so as to form a suspension. This suspension is then transferred to a preheater, where a 5 to 50%, by weight, dissolution of the polymer occurs. In sequence, the mixture is fed to the spinneret bearing extruder, said mixture passing through an open air space on to a cooling bath. In line with the cooling system, the filament bundle runs through an extraction system with a second solvent running in counter-flow with the filaments and later through a drying system. The first solvent is extracted from the yarn by a second solvent which is later evaporated from the yarn. The dry yarn is stretched in at least two steps, the last one being operated at temperatures between 135° C. and 150° C.

U.S. Pat. No. 4,668,717 assigned to Stamicarbon describes a UHMW PE fiber production process, in which a suspension of UHMW PE particles is prepared in an appropriated solvent, at room temperature, and this suspension is transformed into a homogeneous solution inside a single or twin screw extruder, where the mixture is subjected to high mechanical shear, thereby causing the dissolution of the polymer in the solvent. It is necessary that the extruder be operated at relatively high screw rotations, so that the residence times inside it be small and the degradation of the polymer does not accompany its dissolution in the solvent.

U.S. Pat. No. 6,689,462 B2, assigned to DSM, describes the influence of a polymer's narrow molecular weight distribution on its processability, in the case of gel spinning process. To promote better spinning in a gel spinning process, two types of polyethylene (PE) were used, namely: a high molecular weight polyethylene (HMW PE) and an ultra high molecular weight polyethylene (UHMW PE), in the same mixture, taking into account each polymer's intrinsic viscosity.

U.S. Pat. No. 5,230,854, assigned to Allied Corporation, describes a continuous process for the removal of the spinning solvent, which rests entrapped within the yarns. This process comprises the extraction of the spinning solvent by means of a second solvent, preferably a volatile second solvent, in an extraction vessel, said polymer being insoluble in the second solvent. The yarn must have a residual oil content, which is the spinning solvent, also called gelling solvent, of less than 1.5%. Thus, the solution containing the first solvent, which is the spinning solvent, and the second solvent, which is the extraction solvent, is led to a solvent separation equipment, in which a third solvent is added to the solution, said third solvent being capable of extracting the second solvent, forming a two phase mixture. The separated spinning solvent is returned to the beginning of the spinning process, and the solution containing the second and third solvents is led to another equipment, where the recovery of the extraction solvent will take place, possibly by temperature induced phase separation. In case the extraction solvent, called the second solvent, is not volatile, the yarn containing the second solvent will have to be washed with the third solvent, which will be evaporated in a later step.

U.S. Pat. No. 7,147,807, assigned to Honeywell, describes a process utilizing an ultra high molecular weight homopolymer or copolymer dissolved in decalin at a temperature below 250° C., under not inerting conditions, the resulting extruded yarn being cooled in a cooling solution and dried by one or more gas streams, without the use of a second solvent. The solvent, in this case decalin, is used at a temperature close to its boiling point, 250° C., which in turn makes for the expansion of the liquid exiting the extruder, forming vapors which are absorbed by a gas stream which contacts the filaments at a number of stages, until the complete reduction of the gelling solvent concentration to an acceptable level. The filament is then stretched in two stages. A number of processes for the recovery of low molecular weight gelling solvent are claimed in this patent. Besides being complex, the process worries about the explosivity limit of decalin in air at 100° C., which is 0.7%, by vol. In these processes, the vapors are treated in complex recovery systems, on top of presenting the inconvenience of using relatively toxic solvents.

OBJECTIVES OF THE PRESENT INVENTION

The present inventors aimed to minimize solvent and polymer degradation, as compared to the previous techniques. These problems were circumvented by the use of bimodal or multimodal polymers in conjunction with inerting conditions, accomplishing to avoid both the loss of yarn properties as well as risks to the environment. State of the art processes normally utilize low boiling point extraction solvents, such as fluorinated solvents. These solvents pose many disadvantages, being aggressive to the environment as well as costly. In the processes of the present invention, paraffinic $C_5$ to $C_7$ hydrocarbon extraction solvents, or mixtures thereof, are used, which pose very reduced toxicity, being hydrogenated, and have high boiling points, dramatically reducing environmental risks, besides allowing the operation of the extractor at a very reduced flow rate, thereby improving the overall spinning solvent extraction efficiency.

More current processes are using low boiling point and high toxicity gelling solvents, such as decalin, as opposed to non volatile high molecular weight substances, thereby magnifying occupational hazards and explosion risks.

For the case of the well known processes, in the spinning solvent extraction step, which is carried out in a continuous fashion, the yarns may withstand stresses and torsions that can very well cause variations in the linear density and loss of operational stability. On the other hand, in one embodiment of the process of the present invention, the spinning solvent extraction operation is carried out in batches, so as to guarantee the stability of the linear density and properties along the whole yarn, besides a good operational stability.

In order to circumvent the inconveniences of the previous techniques, the present inventors have proposed a batch operation, in which the yarn is spun on perforated reels and placed inside an extractor, where they are fixed. The extraction solvent travels through the reel perforations, allowing an efficient extraction and, therefore, eliminating any risk of linear density variation, or a loss of efficiency due to yarn failure.

DRAWINGS AND GRAPHS

The present invention is duly illustrated in FIGS. 1 to 7, herein attached.

FIG. 1 presents a simplified flow sheet of the installation used for carrying out the polymer suspension preparation, followed by gel extrusion and spinning, according to the process of the present invention.

FIG. 2A shows the conventional spinning solvent extraction operation, and FIG. 2B shows one of the alternate ways to operate the spinning solvent extraction.

Figure 1:
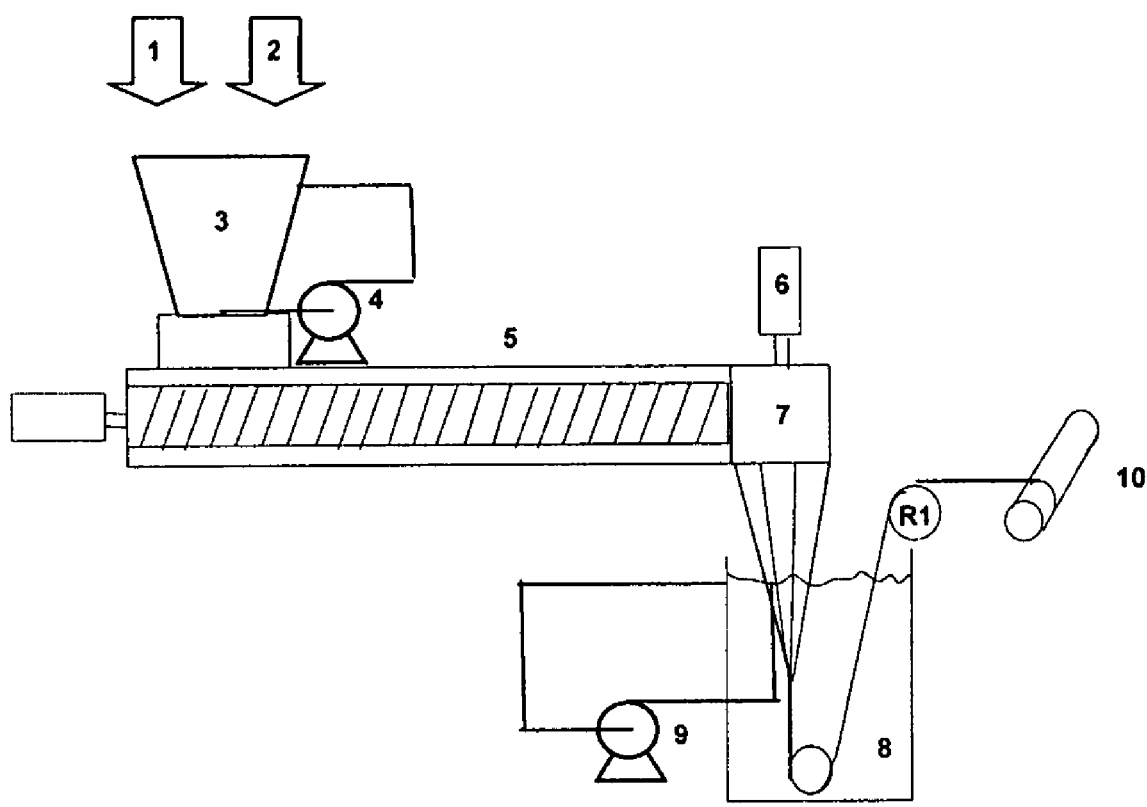
Figure 2A:
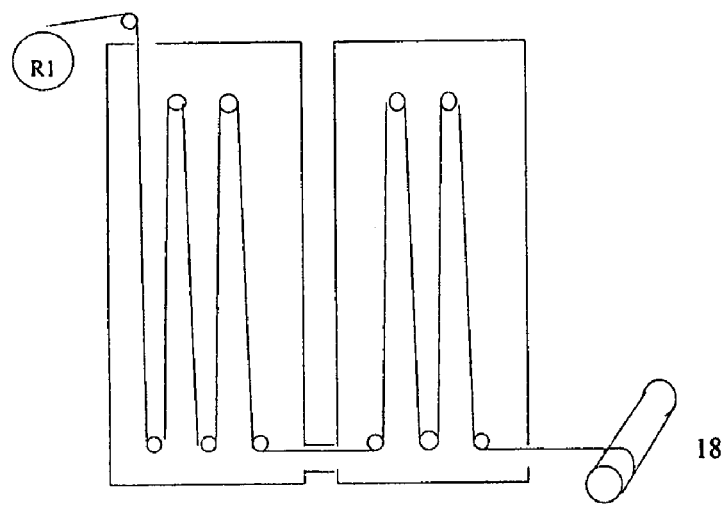
FIGS. 2A and 2B depict units for spinning solvent extraction and drying.
Figure 2B:
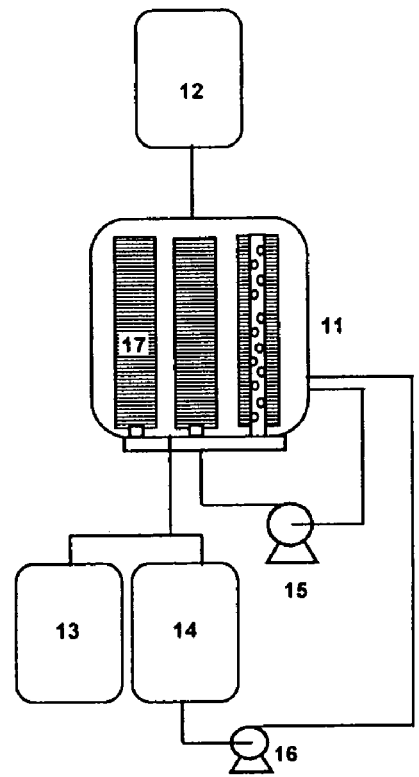
Figure 3:
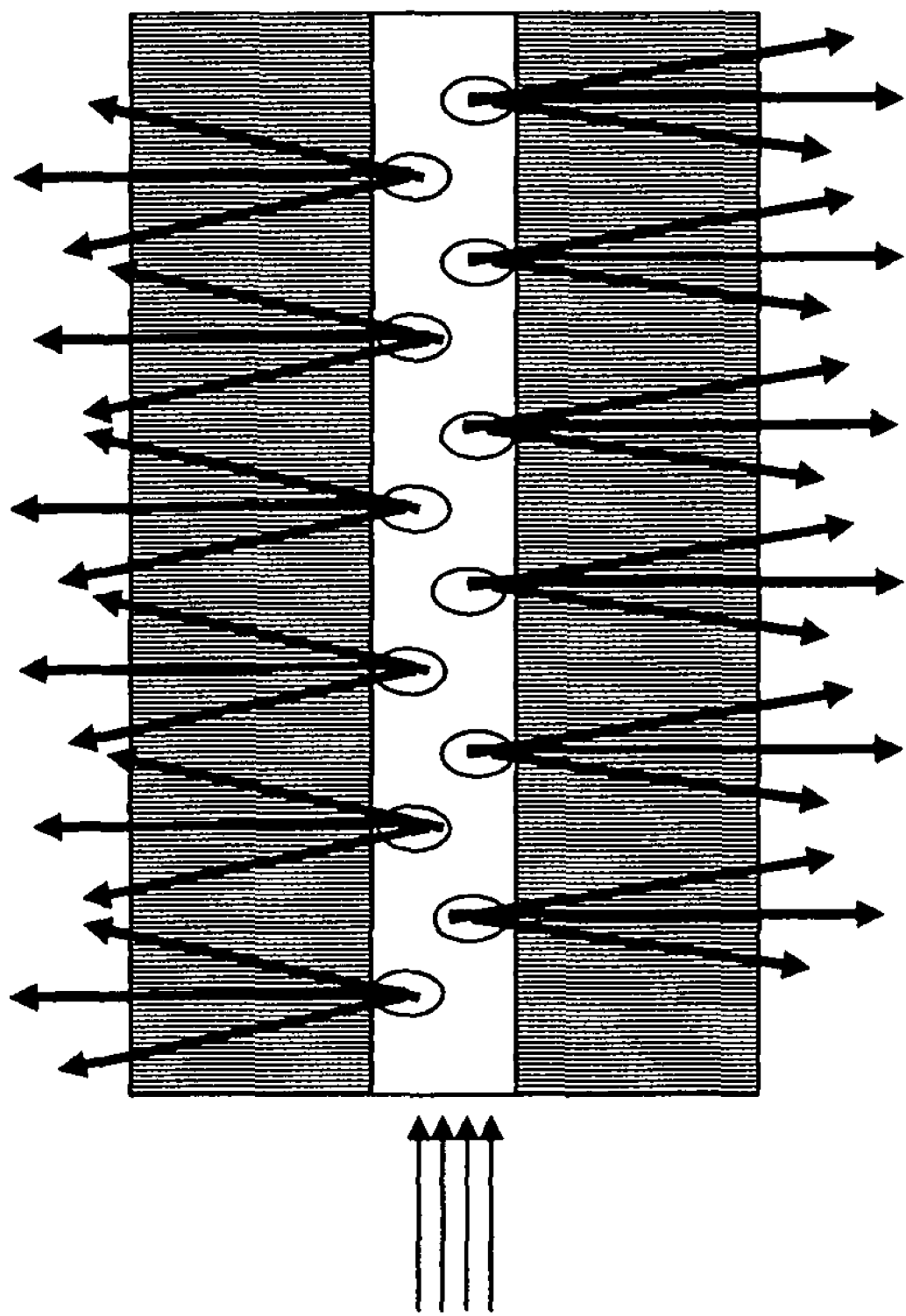
FIG. 3 shows the flow of solvents into and through the yarn reels obtained in the set up shown on FIG. 2B.
Figure 4:
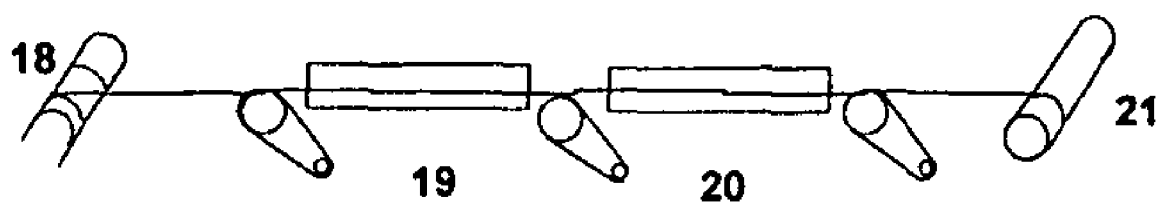

FIG. 4 schematically displays the stretching section of the washed and dried yarns.

Figure 5:
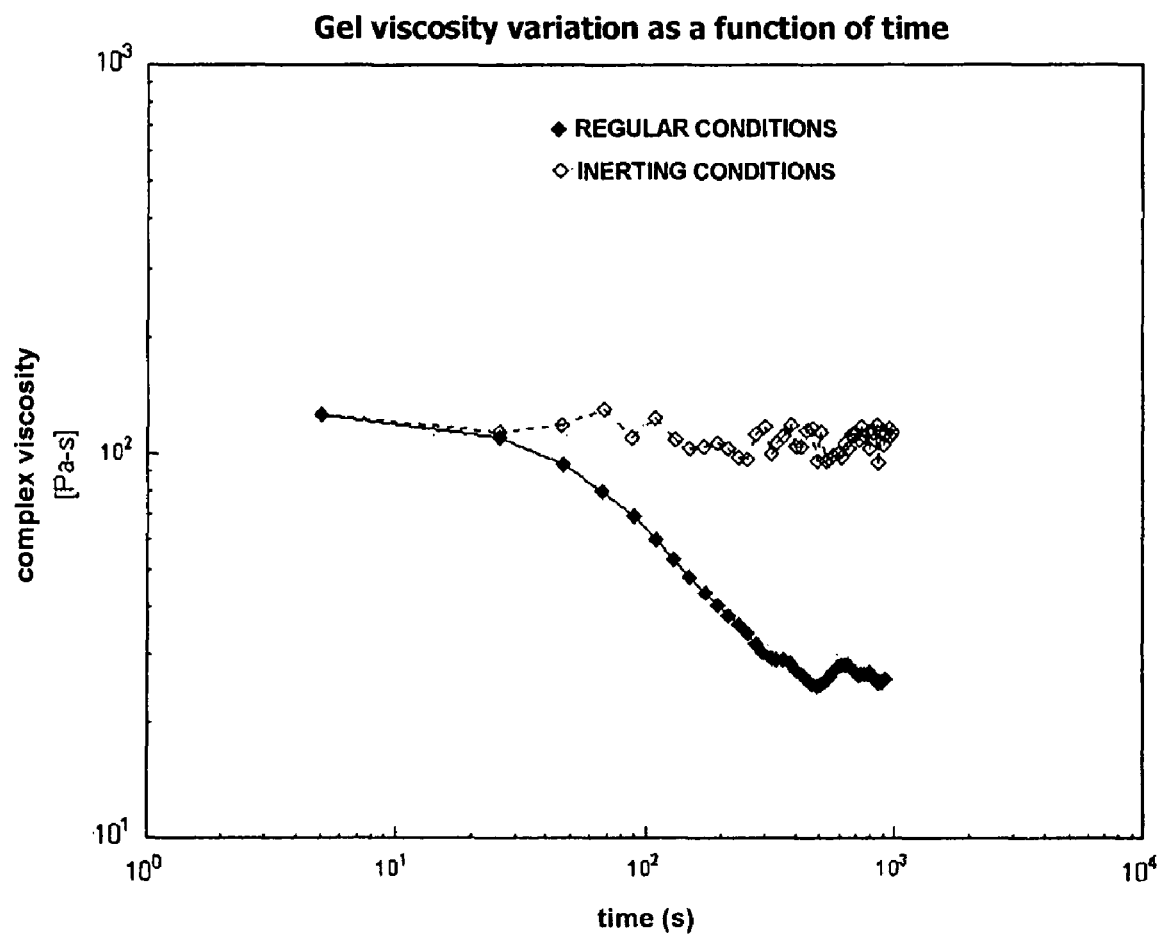

The graph shown on FIG. 5 presents a plot of complex viscosity variation against time, under two different situations. In a first situation, where a spinning process according to the present invention is used, wherein all the steps of polymer mixture preparation, extrusion and spinning are carried out under inerting conditions, and in a second situation, wherein all the steps of polymer mixture preparation, extrusion and spinning are carried out under a regular oxygen bearing atmosphere, as per the prior state of the art.

Figure 6:
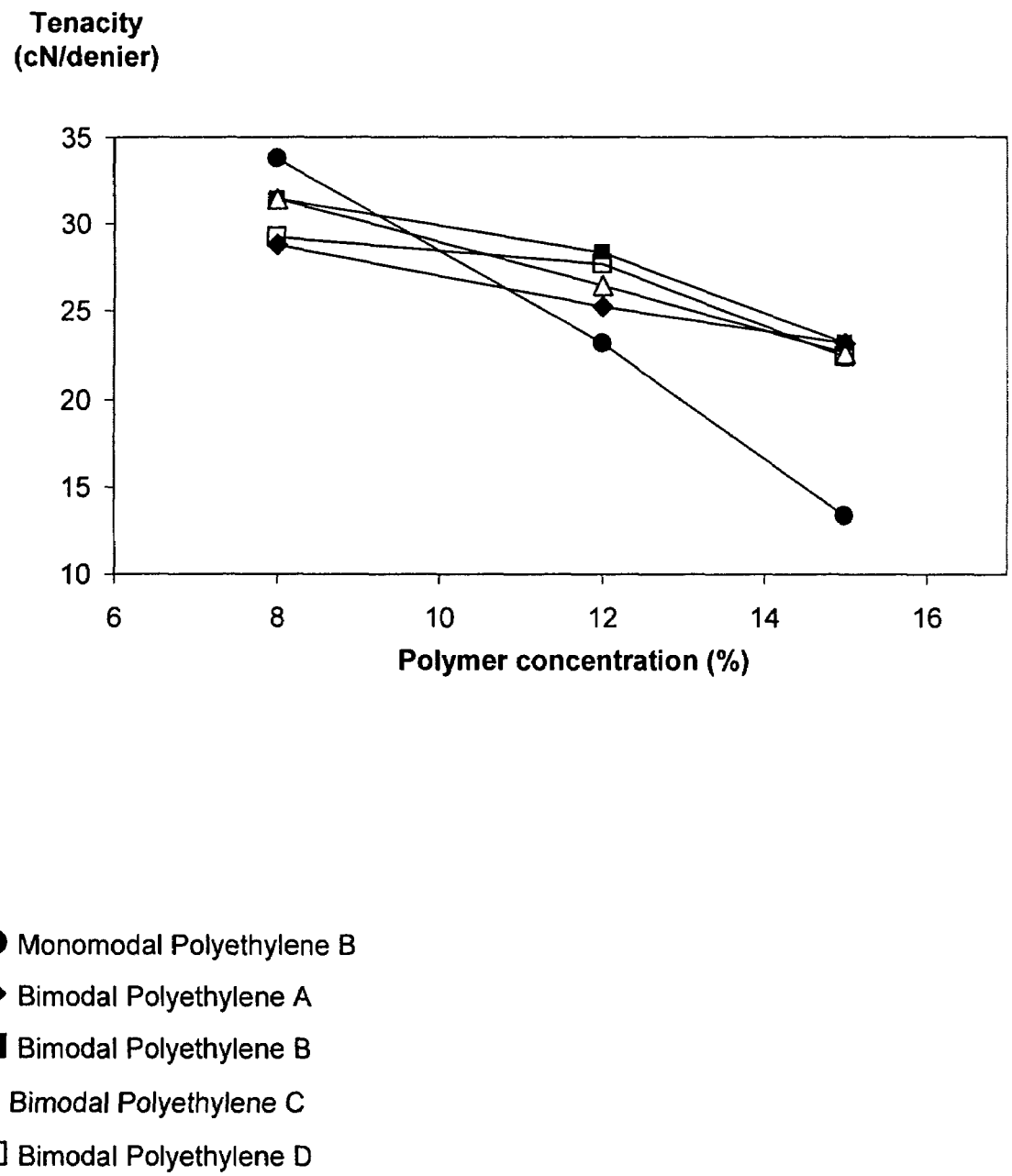

The graph shown on FIG. 6 presents a plot of the variation of the polymer yarn tenacity against polymer concentration (%), using different kinds of monomodal and bimodal polymers, where the better properties of bimodal polymers over monomodal ones are clearly apparent.

Figure 7:
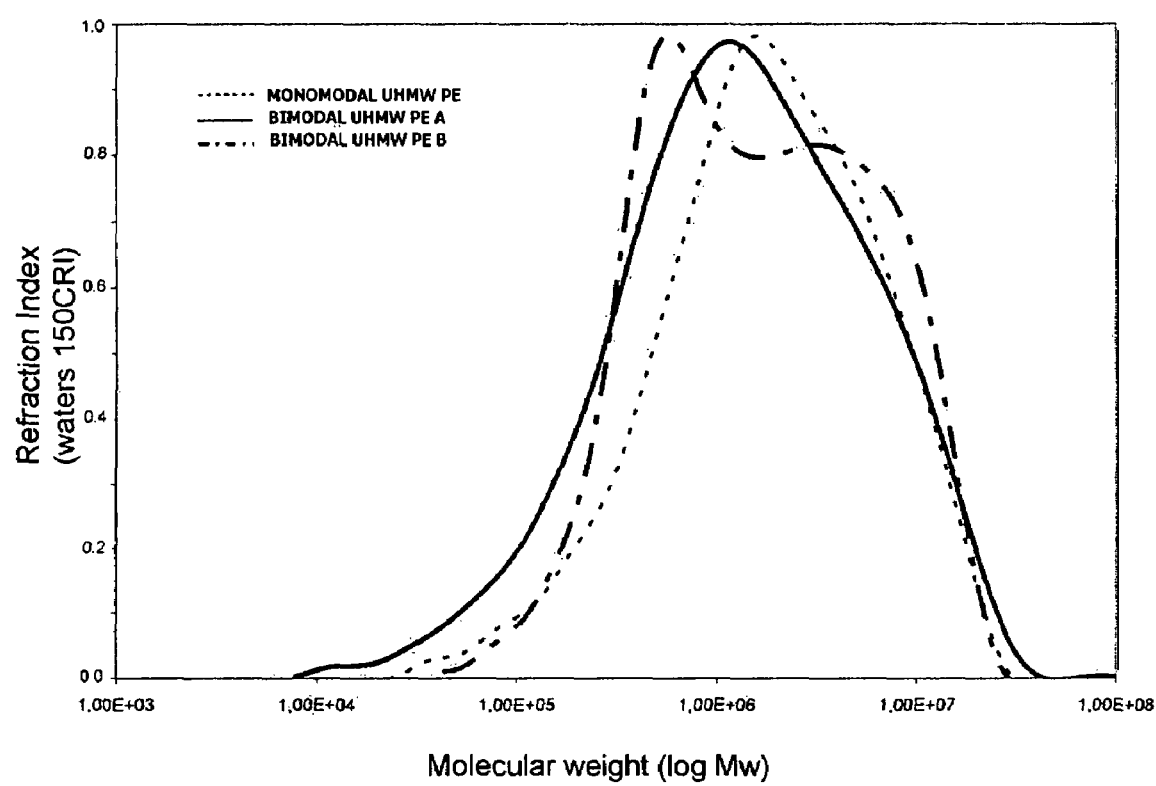

The graph shown on FIG. 7 presents the molecular weight distribution profiles of bimodal and monomodal UHMW PE, as obtained using gas permeation chromatography (GPC).

THE PRESENT INVENTION

The present invention relates to a process for the preparation of high-performance yarns of ultra high molecular weight homopolymers or copolymers, obtained from $C_{2+n}$ monomers, wherein n varies from 0 to 2. One of the improvements of the present process is the introduction of an inerting system, from the initial polymer suspension preparation, comprising a polymer and a solvent, which is fed to an extruder, which is also kept under inert conditions. Said system is completely kept under inerting conditions up to the entry of the filaments into the aqueous cooling bath. These operating conditions allow yarn processing at high temperatures without the occurrence of any degradation of either solvent, e.g., an oil, or homopolymer or copolymer, besides making for a stable process. The absence of any type of component degradation whatsoever allows for its recycle and recirculation into the process, which not only poses a very definite environmental conscience but a process cost savings, as well.

In order to allow for inerting conditions, according to the present invention, it was necessary to develop polymers that show a bimodal or multimodal molecular weight distribution. Polymers that display such a molecular weight distribution show an enhanced processability as well as a reduced degradation profile. Up to the present, good processability was solely achieved through an undesirable degradation of both polymer and spinning solvent (e.g., an oil), for the process was carried out under an oxidizing atmosphere.

The process of the present invention is most advantageous and competitive. Thermal degradation limits the reutilization of the gelling solvent on the long run, because the by-products generated change the chemical characteristics as well as the solubility parameters of the oil, preventing good polymer dissolution when it is reutilized in the process. It has been discovered that oils processed under oxidizing atmospheres display a yellowish color and reduced viscosity, as a function of time, while oils processed under inerting conditions have their initial properties preserved.

The present process is environmentally safer, in that no fluorinated solvents are employed, solvents which are not only harmful to the ozone layer but also have an utilization deadline, according to the Montreal Protocol. The processes described in the previous WO 2005/066400 A1 and WO 2005/066401 A1, use a fluorinated solvent as a second solvent, which has its use limited to 2010, according to the agreements in the Montreal Protocol.

The process of the present invention is also deemed to be less complex, as regards equipment.

The productivity of an industrial plant is directly tied to the concentration of the polymer gel formed, the spinning velocity and the stretching velocity. Processing of higher polymer concentrations, in a same spinning block, yields thicker filaments, which are harder to undergo non fluorinated non polar solvent extraction. Solvent extraction processes carried out in multiple stage batches, for example, allow for the increased flexibility of an industrial plant, since the spinning and extraction steps are independent. One of the advantages of batch extraction is the possibility of a same spinning unit to produce filaments with a wide interval of DPF (denier per filament) values, without it being necessary to rearrange process variables, as illustrated in the present invention.

The productivity of a plant using the process of the present invention is higher, because the productivity is directly tied to the amount of polymer processed per minute, and in the event of an increase in the amount of polymer in the gel, then a larger amount of yarn (weight)/min will be processed and a reduced amount of oil will be used, consequently reducing the amount of solvent to be extracted.

A reactor bimodal molecular weight distribution UHMW PE based polymer used in the manufacture of high performance yarns, such as UHMW PE yarns, sporting different characteristics was produced for the use in the yarn manufacture process of the present invention. The bimodal or multimodal polymer presents an intrinsic viscosity [η] equal to or higher than 12 dl/g, corresponding to an average molecular weight of $2.7 \times 10^6$ g/mol, and polydispersivity around 7, in the case of bimodal polymers, and around 7 to 9, in the case of multimodal polymers. Pure reactor bimodal polymers, or the such combined with other monomodal polymers, can be used in the completion of the present invention, so as to obtain a multimodal physical blend. In all cases, be it using the reactor bimodal polymer or a bimodal polymer resulting from the physical blend of monomodal polymers, or else, using combinations of reactor bimodal and monomodal polymers resulting in a multimodal polymer, gels sporting excellent processability and high productivity are formed.

In processes according to the present invention, the individual products which exit each hole of the spinneret are called filaments, whereas yarn is the bundle of such filaments, treated and handled in a collective form, e.g., during stretching, drying, measuring, etc.

The term monomodal as employed herein means that the molecular weight distribution of the polymer, yarn or filament has only one mode.

The term bimodal as employed herein means that the molecular weight distribution of the polymer, yarn or filament has two modes. A polymer can be bimodal in any of two ways: bimodal per blend of reactor bimodal. Bimodal per blend means a physical blend of two polymers with monomodal characteristics, as described above, showing a bimodal molecular weight distribution. As for reactor bimodal, it means a mixture of polymers obtained via, a polymerization process.

The term multimodal, as employed herein, means that the molecular weight distribution of the polymer, yarn or filament has two or more modes.

In a first embodiment of the present invention, the filaments preparation process from bimodal, multimodal or monomodal ultra high molecular weight homopolymers or copolymers blended with bimodal and/or multimodal ones, according to the present invention, comprises the following steps:

(a) preparing a suspension of a homopolymer or copolymer and non polar long chain solvent (spinning solvent or gelling solvent) in the inerting vessels (1) or (2), followed by its transfer to the mixer (3), under continuous stirring and recirculation through the pump (4), at room temperature, under inert conditions, and at a weight of homopolymer or copolymer to solvent ratio from 2/98 to 30/70;

(b) feeding said homopolymer or copolymer suspension, under inerting conditions, to the extruder (5);

(c) extruding the suspension with the formation of a gel, at a temperature in excess of 150° C., under inerting conditions;

(d) spinning the gel obtained from the extrusion in a spin block (7) with a multi holed spinneret, so as to obtain non-stretched filaments with diameters of at least 1 mm, at a temperature in excess of 150° C., maintaining the inerting conditions;

(e) cooling the non-stretched filament bundle coming from the spin block (7), by immersion in a tank (8) with a circulation system (9), wherein the renovation of cold water enters said bath at a spot directly opposite and aligned with the center of the filament bundle, guaranteeing a perfect homogeneity of the cooling system, followed by take up on the take-up spool (10), at a stretch ratio (R1), which is the take-up spool to filament bundle linear velocity ratio;

(f) treating said non stretched yarn with a second solvent (extraction solvent), for the removal of the first solvent (gelling solvent) in a continuous manner (18) or in batches (11), and later recovering these solvents in a solvent separation process;

(g) drying said non stretched yarn for the removal of the second solvent; and (h) stretching said dry yarn by means of a stretching system (18 to 21), in a continuous manner, comprising at least one stretching step.

In a second embodiment of the present invention, the high performance yarn preparation process from monomodal, bimodal, and multimodal ultra high molecular weight homopolymers or copolymers or monomodal blended with bimodal and/or multimodal ones, obtained from $C_{2+n}$ monomers, wherein n varies from 0 to 2, under regular atmospheric or inerting conditions, comprises the following steps:

(a1) preparing a suspension of homopolymer or copolymer and non polar long chain solvent (spinning solvent or gelling solvent) in the inerting vessels (1) or (2), followed by its transfer to the mixer (3), under continuous stirring and recirculation through the pump (4), at room temperature, under regular atmospheric or inerting conditions, and at a weight of homopolymer or copolymer to solvent ratio from 2/98 to 30/70;

(b1) feeding said homopolymer or copolymer suspension, under regular atmospheric or inerting conditions, to the extruder (5);

(c1) extruding the suspension with the formation of a gel, at a temperature in excess of 150° C., under regular atmospheric or inerting conditions;

(d1) spinning the gel obtained from the extrusion in a spin block (7) with a multi holed spinneret, so as to obtain non-stretched filaments with diameters of at least 1 mm, at a temperature in excess of 150° C., maintaining the regular atmospheric or inerting conditions;

(e1) cooling the non-stretched filament bundle or yarn coming from the spin block (7), by immersion in a tank (8) with a circulation system (9), wherein the renovation of cold water enters said bath at a spot directly opposite and aligned with the center of the filament bundle, guaranteeing a perfect homogeneity of the cooling system;

(f1) taking up the non stretched filament bundle or yarn, prior to the gelling or spinning solvent extraction, on the perforated take-up spool (10, 17), at a velocity in excess of 10 m/min;

(g1) feeding the perforated spools, loaded with non stretched filament bundle or yarn, in an extractor (11), operating in batches, together with the feed of an organic solvent (extraction solvent) with a boiling point below 80° C.;

(h1) extracting said non polar long chain solvent impregnated in the yarns loaded on the spools (17), in at least one stage, by means of the turbulent circulation of said organic solvent through the spool pipe, in an ascending and transversal flow, as depicted on FIG. 4. The system operates with a long enough residence time so as to achieve an equilibrium concentration, at a temperature of at least 30° C. and a pressure of at least 196 kPa (2 $kgf/cm^2$);

(i1) removing the spent organic solvent from the extractor (11), and later recovering the solvent in a solvent separation process;

(j1) drying the non stretched filament bundle or yarn loaded on the spools (17), inside the extractor, by means of a heated gaseous nitrogen stream, which is fed into the extractor (11) in the same manner as the organic solvent, wherein the dry yarn has at most 4%, by weight, and preferably at most 2%, by weight, of the non polar long chain solvent; and (h1) stretching said dry yarns by means of a stretching system (18 to 21), said yarn having at most 4%, by weight, preferably at most 2%, by weight, of the non polar solvent, comprising at least one stretching step at a temperature in excess of 80° C.

The yarn manufacturing processes, according to the present invention, utilize a gel spinning technique based on the procedures described in U.S. Pat. No. 4,413,110, U.S. Pat. No. 4,403,012 and U.S. Pat. No. 4,668,717.

The inventors of the present patent application improved the state of the art processes, proposing more competitive processes in both environmental and economical terms, wherein they utilize conventional equipment and solutions that do not change the properties of the final product, which are the yarns, by means of using the aforementioned bimodal or multimodal or monomodal in a blend with bimodal and/or multimodal polymers. The yarns obtained in such a process of the present invention are special in that they have a multimodal molecular weight distribution, when they are obtained from multimodal homopolymers or copolymers under inerting conditions.

The Polymers

The polymers which are appropriate for use in the process of the present invention have a bimodal or multimodal molecular weight distribution, for they are more easily processed due to the lubricating effect provided by the lower molecular weight chains, which ease the gelling of the higher molecular weight chains in the solvent.

Polyolefins, such as polyethylenes and polypropylenes, are homopolymers that can be useful in the process of the present invention, especially and preferably those derived from $C_{2+n}$ monomers, wherein n varies from 0 to 2. Copolymers that can be useful in for the present invention can be, for example, ultra high molecular weight polyethylene, such as ethylene and butane copolymers.

The Gelling or Spinning Solvent

The spinning or gelling solvents suitable for use in the present invention can be non polar solvents, preferably a non volatile hydrocarbon solvent at processing conditions, and should present a good solubility with the polymer or copolymer to be processed, wherein these preferred solvents are select from long chain —$C_{10}$ to $C_{50}$-hydrocarbons, such as paraffinic mineral oils, aromatic mineral oils and polyethylene based greases.

The Organic Extraction Solvent

The organic solvents used for the extraction of the non polar solvent, which was impregnated in the yarns, must be volatile solvents, to ease yarn drying at the end of the process.

Paraffinic hydrocarbons, or mixtures thereof, dichloromethane(methylene chloride), dichloroethane and diethylic ether are examples of suitable organic extraction solvents. Preferably, the following solvents, n-pentane, n-hexane, heptane, isopentane, methylpentane, or mixtures thereof, are used.

DESCRIPTION OF THE PRESENT INVENTION

The processes described in this invention are shown in a simplified manner, on FIGS. 1 to 4.

The polymer or copolymer (1) and spinning solvent (non polar solvent) (2) suspension preparation step is carried out on a vessel (3), which is kept homogeneous by means of a pump (4) operating at room temperature and under a constant flow of $N_2$. The polymer or copolymer suspension is fed to an extruder (5) under inerting conditions, and the gel will directly form in a first extruding zone, there being no need of a vessel for a prior preparation of said gel. The processing of said suspension in the absence of oxygen avoids the degradation of the oil and polymer mixture components, thus making for a safe and stable process. In the graph of FIG. 5, it is possible to observe the behavior of the complex viscosity as a function of time, for a gel processed under inerting conditions and non inerting conditions. It can be observed that the gel processed under non inerting (oxidizing) conditions displays a reduction of viscosity as time increases, whereas the gel processed under inerting conditions maintains its viscosity all the time. Complex viscosity can be directly related to the molecular weight of the gel components, the higher the viscosity, the higher the molecular weight. Degradation reactions normally involve breaking the molecular chains and consequent reduction of molecular weight, which will cause reduction of the viscosity. The fact that the gel under inerting conditions can maintain its viscosity, as time passes, is related to the ability of those conditions to keep the molecular weight of the oil and polymer mixture components constant throughout the entire process, indicating a lack of degradation of those.

A specially developed bimodal and multimodal molecular weight distribution polymer will make it possible to obtain high tenacity yarns, in a stable process. The developed stable process for preparing filaments according to the present invention yields polymeric or copolymeric yarns having advantageous physical properties, such as a tenacity of 10 to 45 cN/denier. The finished yarns of the present invention preferably have a maximum tenacity of 35 cN/denier.

The extruder (5) is a single screw extruder with L/D greater than 30, preferably equal to 35, with many corresponding heating zones. A gear pump (6) distributes the gel, at a controlled flow rate, through the spinneret (7). The non stretched yarn, in the form of a gel, is cooled in a bath (8) kept at a temperature below 5° C., and is sent to a continuous solvent extraction section or is taken up in the take-up spool (10 or 17), at a velocity of 8 to 20 m/min, in such a way as to maintain the stretch of said yarns below 2:1, and then sent to a solvent extraction section. The cooling bath (8) is equipped with a recirculation system comprising a pump (9), with its discharge positioned in such a way as to provide a geyser type cooling spray, which provides a homogeneous temperature throughout all the bath and accounts for a fast and efficient radial cooling, at the point where the filaments touch the surface of the bath (8). The cooling rate of the filaments affects its crystallization mechanism and degree of crystallinity, which are also tied to the tenacity of the yarn.

In an embodiment of the present invention, the extraction of the non polar solvent, impregnated in the spools or reels where the non stretched filaments are loaded, can be carried out, sequentially, in a multiple stage extraction system (11), operating in batches, with a turbulent internal washing flow. In sequence, the filaments loaded on the spools or reels (17) are dried inside the same system (11). The solvent flow through the spools or reels (17) is shown on FIG. 3. The extractor is closed and sealed, operating at a maximum temperature of 70° C.

After being dried, the filaments undergo a sequential stretching process, through devices (19, 20) as shown on FIG. 4, at a temperature in excess of 80° C.

The homopolymer or copolymer (1) used in the present invention must have an intrinsic viscosity [η] equal to or greater than 12 dl/g and polydispersivity in excess of 5, preferably equal to 8.

The concentration of homopolymer or copolymer, such as ultra high molecular weight polyethylene (UHMW PE), in the suspension may vary from 2 to 30%, by weight, preferably from 8 to 15%, by weight. The suspension formed is inerted with $N_2$, in a controlled fashion, inside vessel (3). The inerting conditions guarantee that there will be no degradation during processing, rendering the process more reliable and preserving gelling solvent (mineral oil) quality, said solvent being recycled.

The extruder (5) temperature must be in excess of 150° C., preferably higher than 210° C. and lower than 300° C., and the temperature of the spinning beam must be in excess of 220° C., preferably lower than 300° C.

The spinneret (7) may be fitted with from 8 to 240 orifices, and have L/D in excess of 10 and a diameter of less than 1.5 mm. The spinneret (7) preferably has from 60 to 100 orifices, an L/D in excess of 30 and a maximum diameter of 1.5 mm.

The cooling bath (8), with a geyser-like system at the center of the filament bundle (5), aligned to it and in the opposite direction, can be fed with water, as long as the temperature does not exceed 5° C., preferably being less than 2° C.

In another preferred embodiment of the present invention, the non polar solvent (2) extraction process, said solvent entrained in the filaments, is carried out in an extraction system (11), wherein the extraction solvent travels in a direction from within to without the perforated spools or reels (17), where the yarns are loaded. Said extraction is carried out in multiple stages, and the maximum pump (5) pressure is 576 kPa (6 kgf/cm$^2$).

After the non polar solvent extraction (2) step, the maximum acceptable solvent (2) content in the filaments is 4%, by weight, for the filaments become somewhat fragile at a solvent content above this level, which makes it difficult to proceed with their stretching.

The bath ratio, expressed in solvent weight to washed filament weight, is one of the most important variables as regards the sizing of the extraction system (11), and the recovery of the extraction solvent. Three alternative extraction processes have been studied.

The first extraction method comprised four individual extractions in series, each with the same volume of pure organic solvent.

In the second extraction method studied, there were four countercurrent extractions steps, wherein only in the last extraction step pure solvent was used.

The third extraction method evaluated comprised four sequential extraction steps, wherein the first extraction step uses recycled solvent, and the following steps use pure organic solvent. This method showed a better bath ratio, namely higher extraction efficiency with a smaller solvent quantity.

The extraction process carried out in multiple stage batches allows for higher operational flexibility, since the spinning and extraction steps are independent.

One of the advantages of the batch extraction, as described in the present invention, resides in the ability of a same spinning unit to manufacture filaments with a wide interval of DPF (denier per filament) values, without it being necessary to modify process equipment.

The total stretch ratio of the filaments must be in excess of 20:1, preferably higher than 25:1, at a temperature between 100° C. and 150° C.

The yarns were graded by traction tests, as described in ASTM D2256.

The productivity of a plant, such as described in the present patent application, is directly tied to the concentration of the polymer in the suspension, the spinning velocity and the stretching velocity. When comparing the filaments formed when passing the suspension through a fixed L/D spinneret, it is seen that upon increasing polymer concentration, the filaments formed are thicker, thus making it more difficult to remove the solvent (spinning solvent).

As the productivity of the plant is directly tied to the amount of polymer processed per unit time, in this case the greater the amount of polymer in the gel, the larger the amount of filament (weight/min) will be processed, thus reducing the amount of solvent (extraction solvent) used, consequently reducing the amount of extraction solvent as well.

The use of bimodal polymers is an alternative to enhance processability without changing process variables.

The use of reactor bimodal or multimodal molecular weight polymers makes it easier to process the gel, due to widening the molecular weight distribution. Lower molecular weight molecules tend to dissolve more quickly in the non polar solvent, working in the guise of a lubricant for the remaining higher molecular weight molecules. Apart form being easier to process the gel containing a higher polymer concentration, the advantage of using such a reactor bimodal or multimodal polymer, is the homogeneity of the polymer as compared to the physical blend.

The yarn produced from a bimodal polymer can be compared to that made from a monomodal polymer, based on the productivity and final yarn properties. As depicted on FIG. 6, an increase in the polymer concentration in the gel formulation causes a reduction of the yarn tenacity. One the one hand, this tendency is minimized when using a bimodal polymer for the production of the yarn, and on the other, it is much pronounced when using a monomodal polymer; this is so much so that at higher polymer concentration in the gel, the tenacity of yarns made from bimodal polymers surpasses those obtained from a monomodal polymer.

To further illustrate the present invention, filaments were made from bimodal and multimodal polymers obtained in conventional lab scale polymerization. On FIG. 7 it can be seen the difference in molecular weight distributions of the bimodal and monomodal polymers used in the following examples.

Example 1

Monomodal Polyethylene A

A suspension containing 8%, by weight, of monomodal ultra high molecular weight linear polyethylene and 92%, by weight, of a paraffinic mineral oil was prepared.

The linear polyethylene has an intrinsic viscosity of 14 dl/g and a polydispersivity (PD) of 3.5.

The suspension is fed, by means of a pump (4), to an extruder (5), where a gel is formed. The extruder is a single screw extruder with L/D as previously described, and a heating profile of 240° C./250° C./260° C., thus forming a uniform solution. The gel is fed to the spinneret (7) by means of a gear pump (6), at the necessary flow rate. The gel passes through a spinneret (7), with 20 orifices of 0.3 mm diameter, at a temperature of 260° C.

The filaments then pass through a water cooling bath (8), at a temperature between −5° C. and +5° C., with a constant flow on site cooled water, where said heated filaments touch the bath. The filament bundle passes through little perforated pipes, at the velocity previously described, and are then led to the extraction system (11).

The non polar solvent extraction is carried out in the extractor (11) using n-hexane and in 4 stages, and the yarn is dried with the help of a warm $N_2$ stream. Afterwards, the stretching of the dried yarn is performed in two stages, the first one at 100° C. and the second one at 120° C. The final stretch ratio is in excess of 20:1.

The filament thus obtained had the following characteristics:

| Linear Density: | 113 denier |
| --- | --- |
| Tenacity: | 32.0 cN/denier |
| Elongation (rupture): | 5% |
| DPF: | 5.6 |

The following Examples 2 and 3, were done to verify the behavior of yarns prepared from different gel concentrations, where it was aimed to achieve higher industrial plant productivity.

Examples 2 and 3

Monomodal Polyethylene A

Two suspensions, each containing 10% and 12%, by weight, of the same ultra high molecular weight polyethylene as in Example 1, and 90% and 88%, by weight, of a paraffinic mineral oil were prepared.

The same spinning procedure as described in Example 1 was followed in Examples 2 and 3.

Yarns with the following characteristics were obtained in Example 2, where polymer concentration was 10%, by weight:

| Linear Density: | 117 denier |
| --- | --- |
| Tenacity: | 30.0 cN/denier |
| Elongation (rupture): | 5% |
| DPF: | 5.8 |

Yarns with the following characteristics were obtained in Example 3, where polymer concentration was 12%, by weight:

| Linear Density: | 126 denier |
| --- | --- |
| Tenacity: | 29.3 cN/denier |
| Elongation (rupture): | 4.7% |
| DPF: | 6.3 |

A small increase in yarn thickness and a slight decrease in yarn tenacity are observed as gel polymer concentrations increase. It was not possible to process a gel with higher polymer concentrations in the conditions described above. The use of bimodal polymers is an alternative to enhance the processability, without having to change process variables.

Examples 4 to 6

Monomodal Polyethylene B

Suspensions respectively containing 8%, 12% and 15%, by weight, of UHMW PE, and 92%, 88% and 85%, by weight, of a paraffinic mineral oil were prepared. The polymer used has an intrinsic viscosity of 28 dl/g and polydispersivity equal to 4.5. The same spinning, extraction and stretching procedures, as described in Example 1, were used. The properties of the yarn thus obtained are shown in Table 1.

TABLE 1

Properties of the yarn produced with different concentrations of high weight monomodal UHMW PE

| Ex. | Polymer % | Yarn Linear Density (denier) | Tenacity (cN/denier) | Elongation (%) | Filament Linear Density (DPF) |
| --- | --- | --- | --- | --- | --- |
| 4 | 8 | 110 | 33.8 | 5.5 | 5.5 |
| 5 | 12 | 190 | 23.2 | 5.1 | 9.5 |
| 6 | 15 | 312 | 13.3 | 5.1 | 15.6 |

Monomodal type polymer, with a higher molecular weight, is even more difficult to process. In lower concentrations, such as 8% polymer, the molecules manage to align themselves forming a high tenacity yarn, however, at 12% polymer, the formation of the gel is difficult and the resulting yarn is hardly stretchable, namely, of low tenacity. However, as the molecular weight of the polymer increases, an increase of almost 20% in tenacity is observed.

The use of polymers with bimodal molecular weight profile enhances gel processability, due to the widening of the molecular weight distribution. The lower molecular weight molecules dissolve more rapidly in the spinning solvent (solvent 1), acting as a lubricant of the remaining higher molecular weight molecules.

Example 7

Bimodal Polyethylene A

A suspension comprising 15%, by weight, of UHMW PE, and 85%, by weight, paraffinic mineral oil was prepared for Example 7. The linear polyethylene has a bimodal molecular weight, 12 dl/g intrinsic viscosity and polydispersivity (PD) 8.7. The spinning, extraction and stretching procedures were identical to the ones described in Example 1.

| | |
|---|---|
| Linear Density: | 194 denier |
| Tenacity: | 23.2 cN/denier |
| Elongation (rupture): | 4.7% |
| DPF: | 9.7 |

Comparing this result to that of Example 3 above, one can ascertain that the bimodal characteristic of the ultra high molecular weight polymer enhances gel processability, making it possible to process a larger amount of polymer (resin) while maintaining final product resistance (tenacity). This behavior is related to the presence of lower molecular weight chains, which act as lubricants thus helping to process the larger chains.

Examples 8 to 10

Bimodal Polyethylene A

For Examples 8 to 10, suspensions with different concentrations of bimodal UHMW PE in paraffinic mineral oil were prepared. The polymer concentration range studied is from 8% to 15%, by weight, as shown on Table 2. The linear polyethylene has a bimodal molecular weight distribution (PD equal to 8.7) and 12 dl/g intrinsic viscosity, similar to the monomodal polymer used in the previous examples. The spinning, extraction and stretching procedures are identical to the ones described in Example 1.

TABLE 2

Variation of UHMW bimodal PE in the gel concentration

| Ex. | Concentration (weight %) | Yarn Linear Density (denier) | Tenacity (cN/denier) | Elongation (%) | Filament Linear Density (DPF) |
|---|---|---|---|---|---|
| 7 | 15 | 194 | 23.2 | 4.7 | 9.7 |
| 8 | 12 | 153 | 25.3 | 5.1 | 7.7 |
| 9 | 10 | 126 | 27.5 | 5.8 | 6.3 |
| 10 | 8 | 90 | 28.8 | 5.0 | 4.5 |

Comparative Example 1

The continuous process for the manufacture of yarns, as described in Allied's U.S. Pat. No. 4,413,110 uses n-hexane as extraction solvent. The preparation is done using a 5%, by weight, polymer concentration in mineral oil, the suspension being subsequently extruded and the paraffinic oil extracted in a continuous manner. The dry yarn is stretched at a ratio of 24.3/1 and initial stretching velocity of 2.0 cm/min, at 130° C. Comparing the results so obtained, with a similar stretch ratio in the present invention's process, the following results were found:

| | |
|---|---|
| Tenacity: | 28.4 cN/denier |
| Elongation (rupture): | 4.8% |

Comparing the properties of the yarn produced according to U.S. Pat. No. 4,413,110 and the yarn in Example 10, we can observe that both processes yielded yarns with similar tenacity and elongation characteristics. However, the process here depicted shows advantages relative to plant productivity. While in the process as per the abovementioned patent, the stretching line is fed at a velocity of 4 cm/min, the process described in this invention is capable to start drawing at a speed of 10 m/min, that is, a 250 times larger speed. On top of that, polymer concentration can be almost doubled without losing any properties in the final product. Both facts represent advantages as related to plant productivity, for the manufacture of the same type product.

Another advantage observed in the present invention's process results, as herein described, and mainly in the case of industrial scale processes, relates to yarn quality. The absence of any type of stretching, during the extraction and turbulent drying stages, allows for the production of yarns with higher thickness homogeneity along them.

Examples 11 to 19

Bimodal Polyethylenes B, C and D

Suspensions respectively containing 8%, 12% and 15%, by weight, of bimodal UHMW PE, and 92%, 88% and 85%, by weight, of a paraffinic mineral oil were prepared. The linear polyethylene has a bimodal molecular weight distribution and intrinsic viscosity varying from 18.3 to 26.5 dl/g, as shown on Table 3. The spinning, extraction and stretching procedures are identical to the ones described in Example 1.

TABLE 3

Variation of concentration and bimodal UHMW PE in the gel

| Ex. | Concentration (weight %) | Viscosity (dl/g) | PD | Yarn Linear Density (denier) | Tenacity (cN/denier) | Elongation (%) | Filament Linear Density (DPF) |
|---|---|---|---|---|---|---|---|
| 11 | 8 | 18.3 | 6.2 | 92 | 31.4 | 5.4 | 5.1 |
| 12 | 12 | 18.3 | 6.2 | 144 | 28.3 | 5.1 | 8.0 |
| 13 | 15 | 18.3 | 6.2 | 180 | 23.2 | 4.6 | 10.0 |
| 14 | 8 | 23.5 | 7.5 | 99 | 31.4 | 5.0 | 5.5 |
| 15 | 12 | 23.5 | 7.5 | 140 | 26.5 | 4.8 | 7.8 |
| 16 | 15 | 23.5 | 7.5 | 177 | 22.6 | 4.4 | 9.9 |
| 17 | 8 | 26.5 | 4.7 | 101 | 29.3 | 4.8 | 5.6 |
| 18 | 12 | 26.5 | 4.7 | 144 | 27.7 | 4.8 | 8.0 |
| 19 | 15 | 26.5 | 4.7 | 177 | 22.4 | 4.7 | 9.9 |

Comparing those examples where polymer concentrations were higher (10% and 12%), one observed that in all cases, irrespective of molecular weight, bimodal polymers yield the highest performance final product, with a higher tenacity when compared to filaments produced from monomodal polymers under the same conditions, as shown on FIG. 6. High industrial plant productivity together with high tenacity yarn production can be obtained by using bimodal polymers.

Examples 20 to 22

Multimodal Polyethylene, Per Physical Blending

For Examples 20 to 22, suspensions were prepared with different polyethylene mixtures, at varied compositions, according to Table 4. Polymer 1 is bimodal polyethylene A, with 12 dl/g intrinsic viscosity and 8.7 polydispersivity, and polymer 2 is a monomodal linear polyethylene B, with 26 dl/g intrinsic viscosity and 4.5 polydispersivity. The resulting mixture has a multimodal molecular weight distribution. Suspension concentration is 12%, by weight, UHMW PE and 88%, by weight, paraffinic mineral oil, in all cases. Spinning, extraction and stretching procedures, were identical to those mentioned in Example 1.

TABLE 4

Multimodal UHMW PE composition variation

| Ex. | Bimodal PE A | Monomodal PE B | Yarn Linear Density (denier) | Tenacity (cN/denier) | Elongation (%) | Filament Linear Density (DPF) |
|---|---|---|---|---|---|---|
| 8 | 100 | 0 | 153 | 25.3 | 5.1 | 7.7 |
| 20 | 90 | 10 | 171 | 20.3 | 4.3 | 8.5 |
| 21 | 70 | 30 | 171 | 22.4 | 4.6 | 8.5 |
| 22 | 60 | 40 | 135 | 27.6 | 4.1 | 6.7 |

High performance yarn resistance and tenacity directly correlate to polymer molecular weight. The higher the fraction of high molecular weight polymer in the multimodal blend, the higher the capacity of the molecules to align and orient themselves, resulting in increased yarn tenacity. However, in the case of very high fractions, there occur blend processing problems.

Examples 23 to 27

Multimodal Polyethylene, Per Physical Blending

For Examples 23 to 27, suspension concentration was varied for the same proportion of bimodal polymer A to monomodal polymer B. The chosen proportion is that of Example 22, 60%, by weight, bimodal polymer A and 40%, by weight, monomodal polymer B, for which the highest tenacity was obtained. Concentrations in the range of 6% to 18% were explored, as shown on Table 5. Spinning, extraction and stretching procedures were identical to those mentioned in Example 1.

TABLE 5

UHMW PE concentration variation in the mixture

| Ex. | Concentration (weight %) | Yarn Linear Density (denier) | Tenacity (cN/denier) | Elongation (%) | Filament Linear Density (DPF) |
|---|---|---|---|---|---|
| 23 | 6% | 72 | 30.3 | 5.7 | 3.6 |
| 24 | 8% | 100 | 32.4 | 4.9 | 5.0 |
| 25 | 10 | 137 | 28.5 | 4.5 | 6.8 |
| 22 | 12% | 135 | 27.6 | 4.2 | 6.7 |
| 26 | 15% | 180 | 24.3 | 4.3 | 9.0 |
| 27 | 18% | 216 | 22.3 | 4.3 | 10.8 |

TABLE 5-continued

UHMW PE concentration variation in the mixture

| Ex. | Concentration (weight %) | Yarn Linear Density (denier) | Tenacity (cN/denier) | Elongation (%) | Filament Linear Density (DPF) |
|---|---|---|---|---|---|

In the diluted state, longer polyethylene chains dispersed in the gel have a greater mobility for their alignment, due to the larger free volume, which helps these chains to get oriented and consequently increase their crystallinity. This theory is evident with the increase in yarn tenacity at lower polymer concentrations.

Examples 28 and 29

Bimodal Polyethylene, Per Physical Blending

Polymer 1 is monomodal polyethylene A, with 14 dl/g intrinsic viscosity and 3.5 polydispersivity (PD), and polymer 2 is a monomodal polyethylene B, with 26 dl/g intrinsic viscosity and 4.5 polydispersivity. This formulation was tested in a proportion of 60%, by weight, polymer 1 and 40%, by weight, polymer 2, at the respective concentrations of 10% and 12%, by weight, UHMW PE and 90% and 88%, by weight, paraffinic mineral oil. Spinning, extraction and stretching procedures, were identical to those mentioned in Example 1. Table 6 displays the properties obtained for these formulations.

TABLE 6

Properties of yarns obtained from bimodal physical blend

| Ex. | Concentration (weight %) | Yarn Linear Density (denier) | Tenacity (cN/denier) | Elongation (%) | Filament Linear Density (DPF) |
|---|---|---|---|---|---|
| 28 | 10% | 117 | 33.3 | 5.0 | 5.8 |
| 29 | 12% | 156 | 29.4 | 5.0 | 7.8 |

High tenacity yarns may be obtained from either reactor bimodal UHMW PE or monomodal polymers physical blend.

It was showed in the examples above that the use of bimodal molecular weight distribution polymers gives high tenacity yarn production in conjunction with high industrial plant productivity.

Examples 30 and 31

Bimodal Polyethylene, Per Physical Blending

The formulation used for Example 28 was tested in a process under inerting conditions. The suspension was homogenized under inerting conditions by means of a pump (4) and fed to the extruder (5), where a gel is formed. Dissolved $O_2$ concentration in the suspension is monitored by means of an equipment submerged in the feeding funnel. The extruder is a single screw extruder with L/D in excess of 30, and a heating profile of 240° C./250° C./260° C. The pressure was fairly high at the spinneret, as compared to a process without inerting conditions, and gel flow at the spinneret exit was turbulent and the resulting yarn had a low tenacity. In Example 31, the same formulation was used, under inerting conditions, but with a 30° C. higher extruder temperature profile. A slight reduction in system pressure was observed, as well as a definite improvement in the gel flow at the end of the spinneret, with a higher tenacity yarn being obtained, when compared with Example 30. Tenacity, linear yarn density, % elongation and DPF under both conditions are shown on Table 7.

TABLE 7

Yarn properties obtained under inerting conditions

| Ex. | Concentration (weight %) | Yarn Linear Density (denier) | Tenacity (cN/denier) | Elongation (%) | Filament Linear Density (DPF) |
|---|---|---|---|---|---|
| 30 | 10 | 252 | 10.8 | 8.0 | 12.6 |
| 31 | 10 | 168 | 26.4 | 8.0 | 8.4 |

Examples 32 and 33

Bimodal Polyethylene, Per Physical Blending, for Inerting Conditions

In order to allow for the obtention of a high tenacity yarn processed under inerting conditions, monomodal polymers 1 and 2 blends were used, with lower ranges of molecular weights, thus producing a bimodal molecular weight distribution mixture. Polymer 1 is monomodal polyethylene A with 14 dl/g intrinsic viscosity and 3.5 polydispersivity, and polymer 2 is monomodal polyethylene C, with 4.5 dl/g intrinsic viscosity. The suspension was made with 95% polymer 1 and 5% polymer 2. The suspension was homogenized under inerting conditions by means of a pump (4) and fed to the extruder (5), where a gel is formed. Dissolved $O_2$ concentration in the suspension is monitored by means of an equipment submerged in the feeding funnel. In Example 32, the formulation is tested under a heating profile of 240° C./250° C./260° C., in the single screw extruder with L/D in excess of 30. Example 33 is different from the preceding one in that the extrusion temperature profile is higher by 30° C. Table 8 shows the filament properties obtained.

TABLE 8

Filament properties obtained under inerting conditions

| Ex. | Concentration (weight %) | Yarn Linear Density (denier) | Tenacity (cN/denier) | Elongation (%) | Filament Linear Density (DPF) |
|---|---|---|---|---|---|
| 32 | 10 | 270 | 20.0 | 6.0 | 13.5 |
| 33 | 10 | 126 | 32.0 | 5.5 | 6.3 |

In the examples shown it is possible to observe that, under inerting conditions, high tenacity yarns can be obtained provided bimodal and lower molecular weight distribution polymers are used. The advantages of working under inerting conditions are the possibilities of recovering process feeds, and allowing for enhanced process economy and environmental friendliness.

The invention claimed is:

1. Process for the preparation of polymer yarns from ultra high molecular weight homopolymers or copolymers, wherein the process comprises the following steps:
   (a1) preparing a suspension of a homopolymer or copolymer and a spinning or gelling solvent, of a non polar nature and having a long carbon atoms chain, in a vessel, followed by its transfer to the mixer, under continuous stirring and room temperature, under regular atmospheric or inert conditions, and at a weight of homopolymer or copolymer to solvent ratio from 2/98 to 30/70; wherein said homopolymer or copolymer has a monomodal, bimodal or multimodal molecular weight distribution, and is obtained from $C_{2+n}$ monomers, wherein n varies from 0 to 2;

(b1) feeding said homopolymer or copolymer suspension, under regular atmospheric or inert conditions, to an extruder;

(c1) extruding the suspension with the formation of a gel, at a temperature in excess of 150° C., under regular atmospheric or inert conditions;

(d1) spinning the gel, as obtained from the extrusion, in a spin block, so as to obtain non-stretched filaments with diameters of at least 1 mm, at a temperature in excess of 150° C., maintaining regular atmospheric or inert conditions;

(e1) cooling the non-stretched filaments or yarns coming from the spin block, by immersion in a tank with a circulation system, wherein the renovation of cold water enters said tank at a spot directly opposite and aligned with the center of the filament bundle, guaranteeing a perfect homogeneity of the cooling system;

(f1) taking up the non stretched filaments or yarns, prior to the gelling or spinning solvent extraction, on a perforated take-up spool, at a velocity in excess of 10 m/min;

(g1) feeding the perforated spools, loaded with the non stretched filaments or yarns, in an extractor operating in batches, together with the feed of an organic extraction solvent, with a boiling point below 80° C.;

(h1) extracting said non polar long chain solvent impregnated in the yarns loaded on the spools, in at least one stage, by means of the turbulent circulation of said organic solvent, in an ascending and transversal flow, the system operating with a residence time sufficient to achieve equilibrium concentration, at a temperature of at least 30° C. and a pressure of at least 196 kPa (2 kgf/cm$^2$);

(i1) removing the spent organic solvent from the extractor, and later recovering the solvents in a solvent separation process;

(j1) drying the non stretched filament bundles or yarns, loaded on the spools, inside the extractor, by means of a gaseous nitrogen stream, which is fed into the extractor in the same manner as the organic solvent, wherein the dry yarn has at most 4%, by weight, and preferably 0%, by weight, of the non polar long chain solvent; and (k1) stretching said dry yarns by means of a stretching system, said yarn having up to 4%, by weight, of the non polar solvent, in at least one stretching step, at a temperature in excess of 80° C.

2. The process according to claim 1, wherein said homopolymer or copolymer is reactor bimodal.

3. The process according to claim 1, wherein said homopolymer or copolymer is multimodal per physical blending.

4. The process according to claim 1, wherein said reactor bimodal or multimodal per physical blending homopolymer or copolymer shows intrinsic viscosity [η] equal to or greater than 12 dl/g, corresponding to 2.7×10$^6$ g/mol average molecular weight.

5. The process according to claim 1, wherein said reactor monomodal homopolymer or copolymer shows intrinsic viscosity [η] equal to or greater than 12 dl/g, corresponding to 2.7×10$^6$ g/mol average molecular weight.

6. The process according to claim 1, wherein said bimodal homopolymer or copolymer shows a polydispersivity value greater than 6.

7. The process according to claim 1, wherein said multimodal per physical blending homopolymer or copolymer shows a polydispersivity value from about 7 to 9.

8. The process according to claim 3, wherein the monomer is polyethylene.

9. The process according to claim 1, wherein said homopolymers are polyolefins.

10. The process according to claim 9, wherein said polyolefins are selected from the group consisting of polyethylenes and polypropylenes.

11. The process according to claim 1, wherein said copolymers are selected from a group comprising ultra high molecular weight polyethylenes obtained from ethylene and butene.

12. The process according to claim 1, wherein said spinning or gelling solvent is selected from a group comprising non volatile hydrocarbon solvents at the process conditions, and showing good solubility with the homopolymer or copolymer processed.

13. The process according to claim 12, wherein said spinning or gelling solvent is selected from the group consisting of long chain —$C_{10}$ to $C_{50}$-hydrocarbons.

14. The process according to claim 13, wherein said spinning or gelling solvent is selected from the group consisting of paraffinic mineral oils, aromatic mineral oils and polyethylene greases.

15. The process according to claim 1, wherein said extraction organic solvent, used in said non polar spinning solvent extraction step, which impregnates the yarns, is volatile.

16. The process according to claim 15, wherein said extraction organic solvent is selected from the group consisting of paraffinic hydrocarbons or mixtures thereof, dichloromethane, dichloroethane, or diethylic ether, or mixtures thereof.

17. The process according to claim 1, wherein said organic extraction solvent is selected from the group consisting of n-pentane, n-butane, heptane, isopentane, methylpentane, or mixtures thereof.

18. The process according to claim 1, wherein the extruder temperature is in excess of 210° C. and the spinning beam temperature is in excess of 220° C.

19. The process according to claim 18, wherein said spinning temperature is lower than 300° C.

20. The process according to claim 1, wherein said spinneret has from 8 to 400 orifices, L/D in excess of 10 and a diameter of less than 1.5 mm.

21. The process according to claim 20, wherein said spinneret has from 60 to 100 orifices, L/D in excess of 30 and a maximum diameter of 1.5 mm.

22. The process according to claim 1, wherein said, tank, with an immersed spray cooling system at the center of the filament bundle, aligned to it and in the opposite direction, is fed with water, at a temperature up to 5° C.

23. The process according to claim 1, wherein said homopolymer or copolymer and non polar spinning or gelling solvent suspension preparation step is carried out in vessel, which is homogenized by means of the pump operating at room temperature, wherein said inert gas which maintains said inert conditions is nitrogen ($N_2$), at a constant flow rate.

24. The process according to claim 1, wherein said non polar spinning or gelling solvent extraction is carried out in multiple stages and maximum pump pressure is 576 kPa (6 kgf/cm$^2$).

25. The process according to claim 1, wherein said non stretched yarn coming from the cooling step is taken up on a perforated spool at a velocity of 8 to 20 m/min, in such a manner that the stretch, at this step, does not exceed 2:1.

26. The process according to claim 1, wherein said extractor is hermetically sealed, operating at a maximum temperature of 70° C.

27. The process of claim 1, wherein the dry yarn of step a (j1) has up to 2% by weight of the non-polar long chain solvent.

28. The process of claim 1, wherein the dry yarn in the stretching step of step (h1) has up to 2% by weight of the non-polar long chain solvent.

29. The process of claim 1, wherein the cooling bath tank is fed with water at a temperature of less than 2° C.

* * * * *

UNITED STATES PATENT AND TRADEMARK OFFICE
CERTIFICATE OF CORRECTION

| | | |
|---|---|---|
| PATENT NO. | : 8,003,027 B2 | Page 1 of 1 |
| APPLICATION NO. | : 11/979951 | |
| DATED | : August 23, 2011 | |
| INVENTOR(S) | : Fernanda Oliveira Vieira Da Cunha et al. | |

It is certified that error appears in the above-identified patent and that said Letters Patent is hereby corrected as shown below:

On the title page item (73), should read:
--Assignee:     Braskem S.A., Camacari (BR)--

Signed and Sealed this
Twentieth Day of March, 2012

David J. Kappos
*Director of the United States Patent and Trademark Office*